UNITED STATES PATENT OFFICE.

SAMUEL PHIPPEN WREFORD AND MARTIN BESTEIRO, OF BROWNSVILLE, TEXAS.

CORN-FLOUR AND PROCESS OF PRODUCING THE SAME.

No. 826,983.　　　　Specification of Letters Patent.　　Patented July 24, 1906.

Application filed October 26, 1905. Serial No. 284,576.

*To all whom it may concern:*

Be it known that we, SAMUEL PHIPPEN WREFORD and MARTIN BESTEIRO, of Brownsville, in the county of Cameron and State of Texas, have invented certain new and useful Improvements in Corn-Flour and Processes of Producing the Same; and we do hereby declare the following to be a full, clear, and exact description of the invention, such as will enable others skilled in the art to which it appertains to make and use the same.

As is well known, the Mexican tortilla is the bread of the Mexican people. It is made from Indian corn, and according to the processes heretofore known for converting the corn into dough it has been impossible to preserve the latter for more than a fraction of a day. In consequence the preparation of the dough has involved a great deal of time and labor on the part of housekeepers, since the corn has to be worked just previous to being used. The making of tortillas calls for such a condition in the corn as makes it impossible to produce them from meal no matter how finely ground.

The object of our invention is to produce an Indian-corn flour which will retain its purity or soundness as long as will wheat-flour and from which tortillas, tamales, and enchiladas may be made without having to resort to the hand-grinding on a metáte, as heretofore practiced.

The invention will be hereinafter fully set forth, and particularly pointed out in the claims.

The Indian corn is placed in a suitable cooking-tank, preferably of the double-shelled type, and sufficient water is added to aid in the cooking, the latter being effected, preferably, by steam admitted to the steam-space of the double-shelled tank. Before the cooking is begun lime-water is supplied to the corn, preferably by the pouring of water over lime contained in a vessel having a perforated metal bottom located above the cooking-tank. The quantity of lime depends greatly upon the strength thereof; but we have found that under ordinary conditions about one peck of lime is required to eight hundred pounds of corn. After the corn has been well stirred, so as to thoroughly mix it with the lime-water, steam is admitted into the steam-space of the double-shelled tank and the corn allowed to cook for about twenty minutes more or less at a moderate temperature, being constantly stirred. After the corn has been thoroughly cooked the steam-supply is cut off, and the water is drained from the tank. The lime-water not only aids in removing the hull from the grain, but it imparts to the flour an adhesiveness which is absolutely necessary to allow it to be converted into the peculiar kind of dough required in forming tortillas, &c. The cooked corn is then conveyed into a washing-machine of any preferred type, where it is thoroughly washed. It is then freed of all water, preferably by means of a centrifugal extractor, and is then dried in a suitable drier. After being thoroughly dried it is reduced to fine flour by a flour-roller or a bur-mill and is now ready for use in the making of tortillas, tamales, and enchiladas. A whiter and cleaner flour may be obtained by passing the corn through a grain-polishing machine of any preferred form and then bolting the flour.

Although the steps of the process above outlined have been found productive of best results, yet they may be somewhat varied without departing from the scope of our invention. For instance, after removing the water from the corn the latter may be coarsely ground in a stone-mill and thereafter dried and then reground and then still further dried, all of which dryings may be effected by any suitable and approved means. The flour thus treated may then be reduced to proper fineness by a flour roller-mill.

The advantages of our invention will be apparent to those skilled in the art to which it appertains. By means of our process the tortilla, tamale, and enchilada eating public may purchase this adhesive Indian-corn flour ready for use, the necessity of preparing the dough under the old hand process just previous to its use being rendered unnecessary.

We claim as our invention—

1. An adhesive flour composed of corn finely floured after being cooked in lime-water.

2. An adhesive flour composed of corn finely floured in a dry state after being cooked in lime-water.

3. The herein-described process of making Indian-corn flour consisting in cooking the corn in lime-water, then washing the corn, then extracting the water therefrom, and then grinding it to flour when dry.

4. The herein-described process of making Indian-corn flour consisting in cooking the corn in lime-water, then crushing the corn, then extracting the water therefrom, then coarsely grinding the corn, then drying it, then regrinding and further drying and then reducing to flour.

In testimony whereof we have signed this specification in the presence of two subscribing witnesses.

SAMUEL PHIPPEN WREFORD.
MARTIN BESTEIRO.

Witnesses:
J. P. ODOM,
LORENZO BINTUREIRA.